US009827761B2

(12) United States Patent
Tsubaki et al.

(10) Patent No.: US 9,827,761 B2
(45) Date of Patent: Nov. 28, 2017

(54) PROCESSING TARGET REFORMING APPARATUS, PRINTING APPARATUS, PRINTING SYSTEM, AND METHOD

(71) Applicants: Kengo Tsubaki, Kanagawa (JP); Yoshiyuki Araseki, Kanagawa (JP); Akira Saito, Kanagawa (JP)

(72) Inventors: Kengo Tsubaki, Kanagawa (JP); Yoshiyuki Araseki, Kanagawa (JP); Akira Saito, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 446 days.

(21) Appl. No.: 14/486,919

(22) Filed: Sep. 15, 2014

(65) Prior Publication Data

US 2015/0076124 A1 Mar. 19, 2015

(30) Foreign Application Priority Data

Sep. 17, 2013 (JP) ................................ 2013-192398
Jul. 30, 2014 (JP) ................................ 2014-155469

(51) Int. Cl.
*B23K 10/00* (2006.01)
*B41J 2/06* (2006.01)
(Continued)

(52) U.S. Cl.
CPC .............. *B41J 2/06* (2013.01); *H05H 1/2406* (2013.01); *H05H 1/46* (2013.01); *B41J 11/0015* (2013.01);
(Continued)

(58) Field of Classification Search
CPC ....... B01J 2/06; B41J 11/0015; H05H 1/2406; H05H 1/46; H05H 2110/2412; H05H 2001/4682; H05H 1/36
(Continued)

(56) References Cited

U.S. PATENT DOCUMENTS 4,029,995 A * 6/1977 Itoh ......................... B03C 7/026 361/226
5,835,113 A * 11/1998 Hirahara .................... B41J 2/06 347/55

(Continued)

FOREIGN PATENT DOCUMENTS

JP 2003-311940 11/2003
JP 2008-132446 6/2008

(Continued)

OTHER PUBLICATIONS

U.S. Appl. No. 14/208,418, filed Mar. 13, 2014.
U.S. Appl. No. 14/204,112, filed Mar. 11, 2014.

*Primary Examiner* — Mark Paschall
(74) *Attorney, Agent, or Firm* — Duft Bornsen & Fettig LLP

(57) ABSTRACT

A processing target reforming apparatus includes: a conveying unit that conveys a processing target along a conveyance path; a discharge unit including a plurality of discharge electrodes aligned along the conveyance path, a counter electrode with the conveyance path interposed therebetween, and a power source that applies a voltage waveform to the discharge electrodes; and a control unit that controls the discharge unit such that a phase of the voltage waveform applied to a first discharge electrode of the discharge electrodes at a timing when a certain point of the processing target passes between the first discharge electrode and the counter electrode is shifted with respect to a phase of the voltage waveform applied by the power source to a second discharge electrode of the discharge electrodes at a timing when the certain point of the processing target passes between the second discharge electrode and the counter electrode.

7 Claims, 12 Drawing Sheets

(51) Int. Cl.
*H05H 1/24* (2006.01)
*H05H 1/46* (2006.01)
*B41J 11/00* (2006.01)

(52) U.S. Cl.
CPC ............... *H05H 2001/2412* (2013.01); *H05H 2001/4682* (2013.01)

(58) Field of Classification Search
USPC ................. 219/121.54, 121.52, 121.43, 388; 392/415–418
See application file for complete search history.

(56) References Cited

U.S. PATENT DOCUMENTS 9,492,826 B2 * 11/2016 Hanagata ................ B01L 7/525
2005/0217798 A1 * 10/2005 Sugiyama ......... H01J 37/32009 156/345.45
2007/0058019 A1 * 3/2007 Saitoh .................. C09D 11/101 347/101
2009/0290007 A1 11/2009 Saitoh et al.
2011/0064489 A1 3/2011 Bisaiji et al.
2012/0141181 A1 6/2012 Bisaiji et al.
2013/0250017 A1 * 9/2013 Saitoh ........................ C08J 7/00 347/101
2014/0078212 A1 3/2014 Nakai et al.
2014/0160197 A1 * 6/2014 Hirose ................. B41M 5/0011 347/16
2015/0035918 A1 * 2/2015 Matsumoto .......... B41M 5/0011 347/101

FOREIGN PATENT DOCUMENTS

JP 2011-059639 3/2011
JP 2012-123062 6/2012
JP 2013-044813 3/2013

* cited by examiner

PROCESSING TARGET REFORMING APPARATUS, PRINTING APPARATUS, PRINTING SYSTEM, AND METHOD

CROSS-REFERENCE TO RELATED APPLICATIONS

The present application claims priority to and incorporates by reference the entire contents of Japanese Patent Application No. 2013-192398 filed in Japan on Sep. 17, 2013 and Japanese Patent Application No. 2014-155469 filed in Japan on Jul. 30, 2014.

BACKGROUND OF THE INVENTION

1. Field of the Invention

The present invention relates to a processing target reforming apparatus, a printing apparatus, a printing system, and a method.

2. Description of the Related Art

Most conventional inkjet recording apparatuses employ a shuttle structure that causes a head to reciprocate in the width direction of a recording medium, such as paper and a film. This makes it difficult to increase throughput in high-speed printing. To support high-speed printing, there has recently been developed a one-pass structure that performs recording at a time with a plurality of heads aligned to cover the whole width of a recording medium.

While the one-pass structure is effectively used for high-speed printing, it causes adjacent dots to land at short time intervals, thereby causing adjacent dots to land before previously landing ink permeates into a recording medium. This causes union of adjacent dots (hereinafter, referred to as droplet interference), resulting in reduced image quality, such as beading and bleeding.

To perform printing on an impermeable medium or a slow-permeable medium, such as a film and coated paper, with an inkjet printing apparatus, adjacent ink dots flow to unite, thereby causing an image defect, such as beading and bleeding. To address this, there have been developed a method of applying a pre-applied agent to the medium in advance to increase the aggregability and the fixability of an ink and a method of using an ultraviolet (UV) curable ink.

In the method of applying a pre-applied agent to a print medium in advance, however, it is necessary to evaporate and dry moisture of the pre-applied agent besides moisture of the ink. Thus, the method requires a longer drying time and a larger drying apparatus. The method of using a pre-applied agent, which is a supply item, and a UV curable ink, which is relatively expensive, increases printing cost.

In view of the above, there is a need to provide a processing target reforming apparatus, a printing apparatus, a printing system, and a method that can manufacture a high-quality printed material while suppressing an increase in cost.

SUMMARY OF THE INVENTION

It is an object of the present invention to at least partially solve the problems in the conventional technology.

A processing target reforming apparatus includes: a conveying unit that conveys a processing target along a conveyance path; a discharge unit including a plurality of discharge electrodes aligned along the conveyance path, a counter electrode arranged facing the discharge electrodes with the conveyance path interposed therebetween, and a power source that applies a voltage waveform to the discharge electrodes; and a control unit that controls the discharge unit such that a phase of the voltage waveform applied to a first discharge electrode of the discharge electrodes at a timing when a certain point of the processing target passes between the first discharge electrode and the counter electrode is shifted with respect to a phase of the voltage waveform applied by the power source to a second discharge electrode of the discharge electrodes at a timing when the certain point of the processing target passes between the second discharge electrode and the counter electrode.

A printing system includes at least a plasma processing apparatus that performs plasma processing on a processing target and a recording apparatus that performs inkjet recording on a surface of the processing target on which plasma processing is performed by the plasma processing apparatus. The printing system includes: a conveying unit that conveys the processing target along a conveyance path; a discharge unit including a plurality of discharge electrodes aligned along the conveyance path, a counter electrode arranged facing the discharge electrodes with the conveyance path interposed therebetween, and a power source that applies a voltage waveform to the discharge electrodes; and a control unit that controls the discharge unit such that a phase of the voltage waveform applied to a first discharge electrode of the discharge electrodes at a timing when a certain point of the processing target passes between the first discharge electrode and the counter electrode is shifted with respect to a phase of the voltage waveform applied by the power source to a second discharge electrode of the discharge electrodes at a timing when the certain point of the processing target passes between the second discharge electrode and the counter electrode.

A method uses a printing apparatus including at least a plasma processing unit that performs plasma processing on a processing target and a recording unit that performs inkjet recording on a surface of the processing target on which plasma processing is performed by the plasma processing unit. The plasma processing unit includes a conveying unit that conveys the processing target along a conveyance path and a discharge unit including a plurality of discharge electrodes aligned along the conveyance path, a counter electrode arranged facing the discharge electrodes with the conveyance path interposed therebetween, and a power source that applies a voltage waveform to the discharge electrodes. The method includes: performing plasma processing on the processing target with the plasma processing unit; controlling the discharge unit such that a phase of the voltage waveform applied to a first discharge electrode of the discharge electrodes at a timing when a certain point of the processing target passes between the first discharge electrode and the counter electrode is shifted with respect to a phase of the voltage waveform applied by the power source to a second discharge electrode of the discharge electrodes at a timing when the certain point of the processing target passes between the second discharge electrode and the counter electrode; and performing inkjet recording on the surface of the processing target with the recording unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
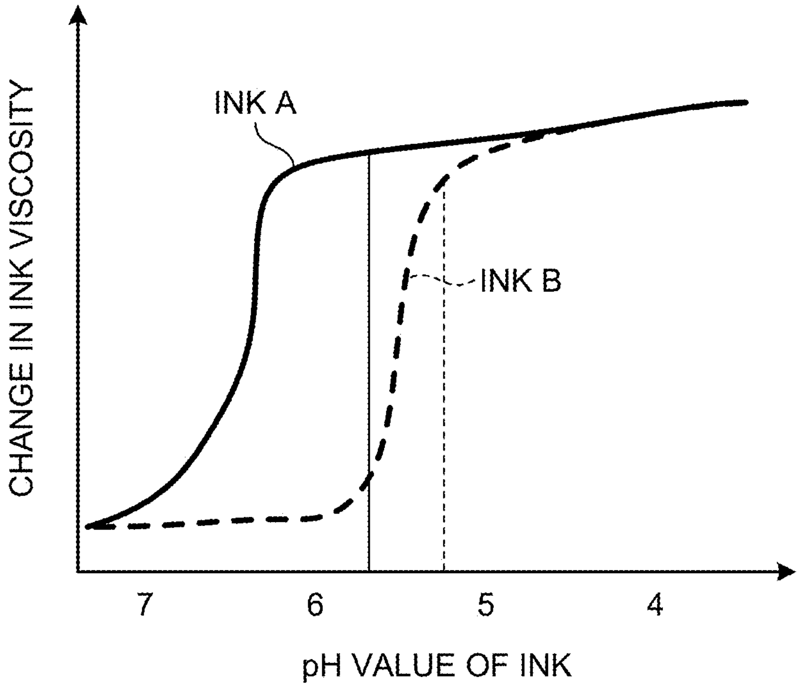
FIG. 1 is a diagram of an example of the relation between the pH value and the viscosity of inks according to an embodiment of the present invention.

Exemplary embodiments according to the present invention are described below in greater detail with reference to the accompanying drawings. Because an embodiment described below is an exemplary embodiment of the present invention, various technically suitable limitations are attached thereto. The description below is not intended to improperly limit the scope of the invention. Not all components described in the embodiment are essential for the present invention.

To prevent dispersion of ink pigments and aggregate the pigments immediately after an ink lands on a processing target (also referred to as a recording medium or a print medium), the embodiment below acidifies the surface of the processing target. The embodiment describes plasma processing as an acidifying means.

The embodiment below controls the wettability of the surface of the processing target subjected to plasma processing and the aggregability of the ink pigments and the permeability depending on reduction in the pH value. Thus, the embodiment improves the circularity of an ink dot (hereinafter, simply referred to as a dot) and prevents union of dots, thereby increasing the sharpness and the color gamut of the dots. This can solve an image defect, such as beading and bleeding, thereby providing a printed material on which a high-quality image is formed. Furthermore, the embodiment makes the aggregation thickness of the pigments on the processing target thin and even, thereby reducing the amount of ink droplet. This can reduce energy for drying the ink and printing cost.

In the plasma processing serving as an acidifying means (process), a processing target is irradiated with plasma in the atmosphere. Thus, polymers on the surface of the processing target react to form a hydrophilic functional group. Specifically, electrons e released from a discharge electrode are accelerated in an electric field to excite and ionize atoms and molecules in the atmosphere. The ionized atoms and molecules also release electrons, thereby increasing the number of high-energy electrons. This results in generation of streamer discharge (plasma). The high-energy electrons in the streamer discharge cut polymer bonds on the surface of a processing target 20 (e.g., coated paper) (a coating layer 21 of the coated paper is solidified with calcium carbonate and starch serving as a binder, and the starch has a polymer structure). The polymers recombine with oxygen radicals O*, hydroxyl radials (—OH), and ozone $O_3$ in a vapor phase. The processing described above is referred to as plasma processing. This processing forms a polar functional group, such as a hydroxyl group and a carboxyl group, on the surface of the processing target, thereby providing hydrophilicity and acidity to the surface of a print medium. An increase in the number of carboxyl groups acidifies (reduces the pH value of) the surface of the print medium.

To prevent a situation where adjacent dots on the processing target from wetly spreading to unite because of increased hydrophilicity and colors mix between the dots, it is important to aggregate a colorant (e.g., a pigment and a dye) in the dots. In addition, it is also important to dry a vehicle or cause the vehicle to permeate into the processing target before the vehicle wetly spreads. Therefore, the embodiment performs acidification for acidifying the surface of the processing target as preprocessing prior to inkjet recording.

Acidification in this description means to lower the pH value of the surface of the print medium to a pH value at which the pigments included in the ink aggregate. To lower the pH value is to increase the density of hydrogen ions $H^+$ in an object. The pigments in the ink before coming into contact with the surface of the processing target are negatively charged and dispersed in the vehicle. FIG. 1 illustrates an example of the relation between the pH value and the viscosity of inks. As illustrated in FIG. 1, the viscosity of an ink increases as the pH value thereof decreases. This is because the negatively charged pigments in the vehicle of the ink are electrically neutralized as the acidity of the ink increases and thus aggregate. By lowering the pH value of the surface of the print medium such that the pH value of the ink reaches a value corresponding to required viscosity in the graph illustrated in FIG. 1, for example, it is possible to increase the viscosity of the ink. This is because, when the ink adheres to the acidified surface of the print medium, the pigments are electrically neutralized by hydrogen ions $H^+$ on the surface of the print medium and thus aggregate. This can prevent color mixture between adjacent dots and prevent the pigments from permeating deeply into the print medium (or to the back surface thereof). To lower the pH value of the ink to a pH value corresponding to required viscosity, it is necessary to make the pH value of the surface of the print medium lower than the pH value of the ink corresponding to the required viscosity.

The pH value at which the ink has the required viscosity varies depending on the characteristics of the ink. In other words, some inks increase its viscosity with pigments aggregating at a pH value relatively near the neutrality as indicated by an ink A in FIG. 1, and others require a pH value lower than that of the ink A for aggregation of pigments as indicated by an ink B having different characteristics from those of the ink A.

The behavior of a colorant aggregating in a dot, the dry speed of a vehicle, and the permeation speed of the vehicle into a processing target vary depending on the amount of droplet varying depending on the size of the dot (a small droplet, a medium droplet, and a large droplet) and on the type of the processing target. The embodiment may control the amount of plasma energy in plasma processing to an optimum value depending on the type of the processing target and the printing mode (amount of droplet).

Figure 2:
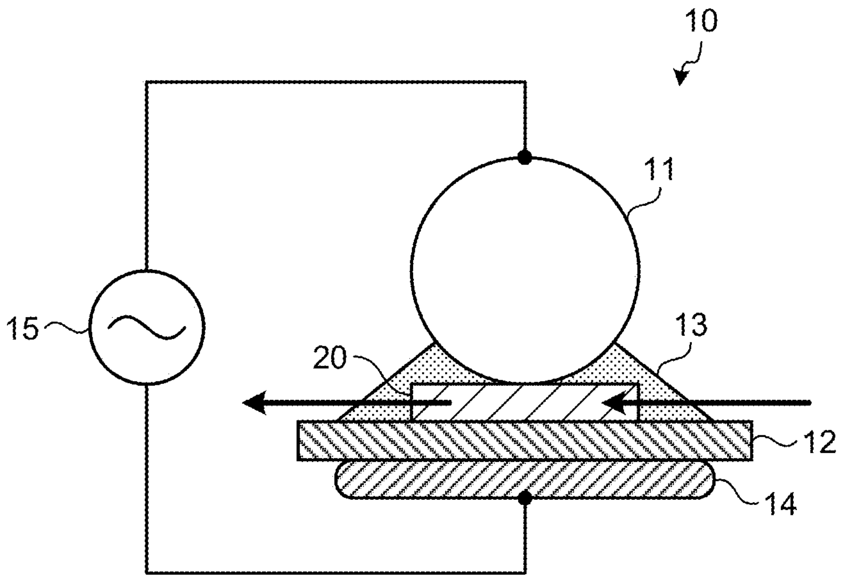
FIG. 2 is a schematic of an example of a plasma processing apparatus according to the embodiment.

FIG. 2 is a schematic for explaining an outline of acidification employed in the embodiment. As illustrated in FIG. 2, acidification employed in the embodiment is performed by a plasma processing apparatus 10 including a discharge electrode 11, a counter electrode 14, a dielectric 12, and a high-frequency high-voltage power source 15. In the plasma processing apparatus 10, the dielectric 12 is arranged between the discharge electrode 11 and the counter electrode 14. In the discharge electrode 11 and the counter electrode 14, a metal part may be exposed or covered with a dielectric or an insulator, such as an insulation rubber and a ceramic. The dielectric 12 arranged between the discharge electrode 11 and the counter electrode 14 may be an insulator, such as polyimide, silicon, and ceramic. In the case of employing corona discharge as plasma processing, the dielectric 12 is not necessarily provided. By contrast, in the case of employing dielectric barrier discharge, for example, the dielectric 12 is preferably provided. In this case, the dielectric 12 is preferably arranged not adjacent to or in contact with the discharge electrode 11 but adjacent to or in contact with the counter electrode 14. This configuration can expand an area of creeping discharge, thereby increasing the effects of plasma processing. The discharge electrode 11 and the counter electrode 14 (or the dielectric 12 regarding one of the electrodes at which the dielectric 12 is provided) may be arranged at a position coming into contact with the processing target 20 passing between the two electrodes or a position not coming into contact therewith.

The high-frequency high-voltage power source 15 applies a high-frequency and high-voltage pulse voltage between the discharge electrode 11 and the counter electrode 14. The value of the pulse voltage is set to approximately 10 kV p-p, for example. The frequency thereof may be set to approximately 20 kHz, for example. By supplying such a high-frequency and high-voltage pulse voltage between the two electrodes, atmospheric non-equilibrium plasma 13 is generated between the discharge electrode 11 and the dielectric 12. The processing target 20 passes between the discharge electrode 11 and the dielectric 12 while the atmospheric non-equilibrium plasma 13 is being generated. Thus, the surface of the processing target 20 facing the discharge electrode 11 is subjected to plasma processing.

The plasma processing apparatus 10 illustrated in FIG. 2 employs a rotary discharge electrode 11 and a belt-conveyer-type dielectric 12. The processing target 20 is nipped and conveyed between the rotating discharge electrode 11 and the dielectric 12, thereby passing through the atmospheric non-equilibrium plasma 13. Thus, the surface of the processing target 20 comes into contact with the atmospheric non-equilibrium plasma 13, thereby being uniformly subjected to plasma processing. The plasma processing apparatus employed in the embodiment is not limited to the configuration illustrated in FIG. 2. Various modifications may be made, such as a configuration in which the discharge electrode 11 is not in contact with the processing target 20 but adjacent thereto and a configuration in which the discharge electrode 11 is mounted on the same carriage as that for an inkjet head. Instead of the belt-conveyer-type dielectric 12, a flat-plate dielectric 12 may be employed.

Figure 3:
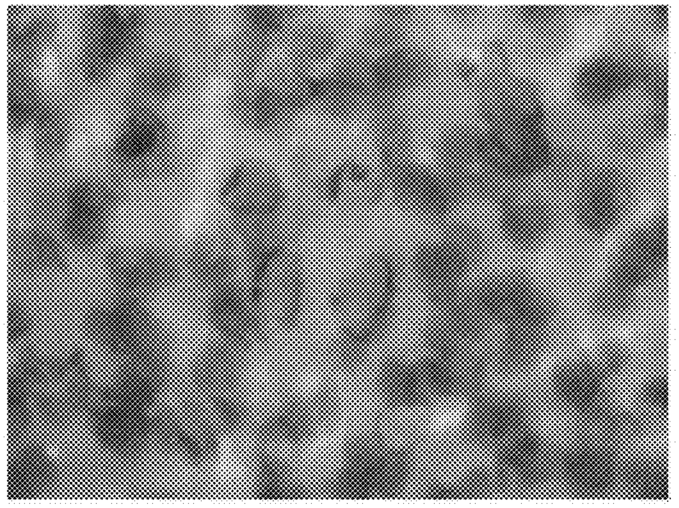
FIG. 3 is an enlarged view of an image obtained by capturing an image of an image formation surface of a printed material resulting from inkjet recording performed on a processing target not subjected to plasma processing according to the embodiment.
Figure 4:
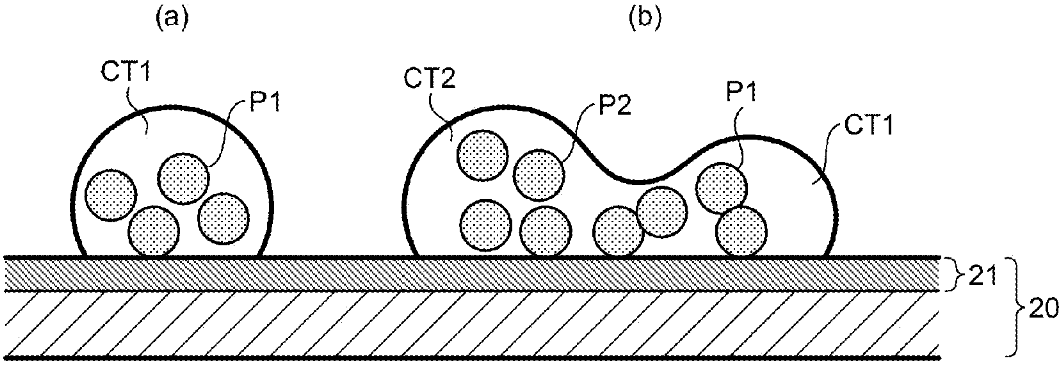
FIG. 4 is a schematic of an example of dots formed on the image formation surface of the printed material illustrated in FIG. 3.
Figure 5:
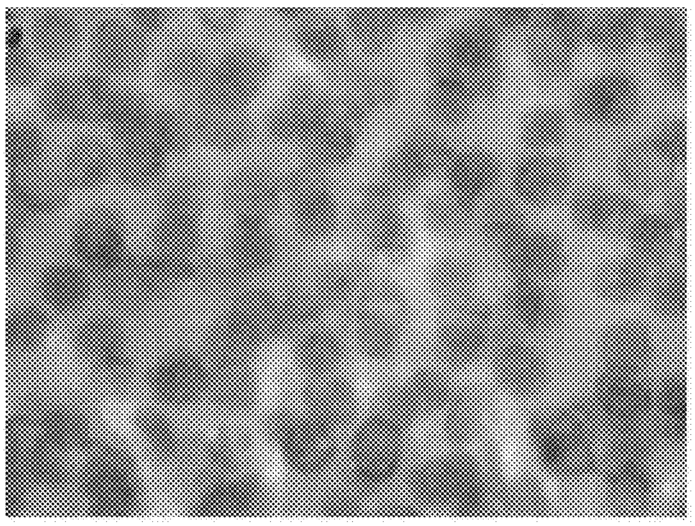
FIG. 5 is an enlarged view of an image obtained by capturing an image of an image formation surface of a printed material resulting from inkjet recording performed on a processing target subjected to plasma processing according to the embodiment.
Figure 6:
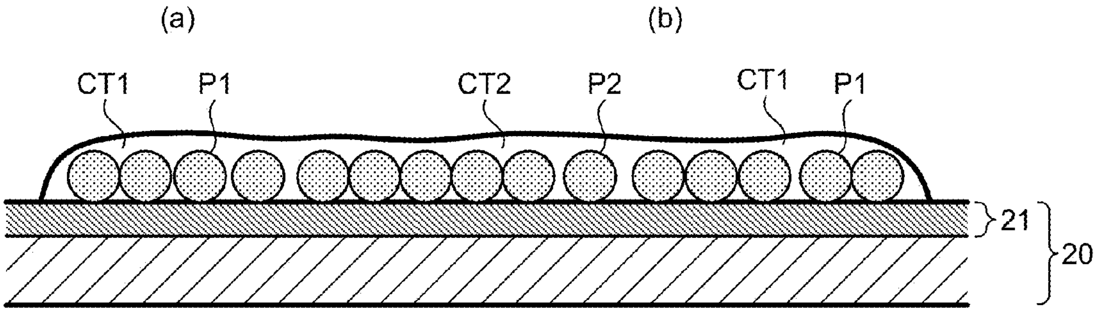
FIG. 6 is a schematic of an example of dots formed on the image formation surface of the printed material illustrated in FIG. 5.

The following describes a difference in a printed material between a case where the plasma processing according to the embodiment is performed and a case where the plasma processing is not performed with reference to FIGS. 3 to 6. FIG. 3 is an enlarged view of an image obtained by capturing an image of an image formation surface of a printed material resulting from inkjet recording performed on a processing target not subjected to the plasma processing according to the embodiment. FIG. 4 is a schematic of an example of dots formed on the image formation surface of the printed material illustrated in FIG. 3. FIG. 5 is an enlarged view of an image obtained by capturing an image of an image formation surface of a printed material resulting from inkjet recording performed on a processing target subjected to the plasma processing according to the embodiment. FIG. 6 is a schematic of an example of dots formed on the image formation surface of the printed material illustrated in FIG. 5. To obtain the printed materials illustrated in FIG. 3 and FIG. 5, a desktop inkjet recording apparatus was used, and typical coated paper including a coating layer was used as the processing target 20.

Coated paper not subjected to the plasma processing according to the embodiment has poor wettability of the coating layer formed on the surface of the coated paper. In an image formed by inkjet recording performed on the coated paper not subjected to the plasma processing, the shape of a dot (shape of a vehicle CT1) adhering to the surface of the coated paper is distorted when the dot lands thereon as illustrated in FIG. 3 and FIG. 4, for example. If an adjacent dot is formed in a state where the dot is not sufficiently dried yet, the vehicle CT1 and a vehicle CT2 unite when the adjacent dot lands on the coated paper as illustrated in FIG. 3 and FIG. 4. This may possibly cause movement (color mixture) of pigments P1 and P2 between the dots, resulting in density unevenness caused by beading, for example.

By contrast, a coated paper subjected to the plasma processing according to the embodiment has improved wettability of a coating layer 21 formed on the surface of the coated paper. In an image formed by inkjet recording performed on the coated paper subjected to the plasma processing, the vehicle CT1 spreads into a relatively flat perfect circle on the surface of the coated paper as illustrated in FIG. 5, for example. Thus, the dot is formed into a flat shape as illustrated in FIG. 6. Because the surface of the coated paper is acidified by a polar functional group formed by the plasma processing, the ink pigments are electrically neutralized. Thus, the pigments P1 aggregate to increase the viscosity of the ink. This suppresses movement (color mixture) of the pigments P1 and P2 between the dots even if the vehicle CT1 and the vehicle CT2 unite as illustrated in FIG. 6. Because a polar functional group is also generated in the coating layer 21, the permeability of the vehicle CT1 increases. This enables the vehicle CT1 to be dried in a relatively short time. The dot spreading into a perfect circle because of the improved wettability aggregates while permeating, whereby the pigments P1 aggregate uniformly in the height direction. This can suppress density unevenness caused by beading, for example. FIG. 4 and FIG. 6 are schematics, and the pigments actually aggregate in layers also in the case of FIG. 6.

In the processing target 20 subjected to the plasma processing according to the embodiment, the plasma processing forms a hydrophilic functional group on the surface of the processing target 20, thereby improving the wettability. As a result of formation of a polar functional group by the plasma processing, the surface of the processing target 20 is acidified. Thus, the landing ink uniformly spreads on the surface of the processing target 20, and the negatively charged pigments are neutralized on the surface of the processing target 20. This causes the pigments to aggregate and increase the viscosity, making it possible to suppress movement of the pigments even if the dots eventually unite. Because a polar functional group is also generated in the coating layer formed on the surface of the processing target 20, the vehicle quickly permeates into the processing target 20, making it possible to reduce the drying time. In other words, the dot spreading into a perfect circle because of the improved wettability permeates in a state where movement of the pigments is suppressed by aggregation. This enables the dot to maintain a shape close to a perfect circle.

Figure 7:
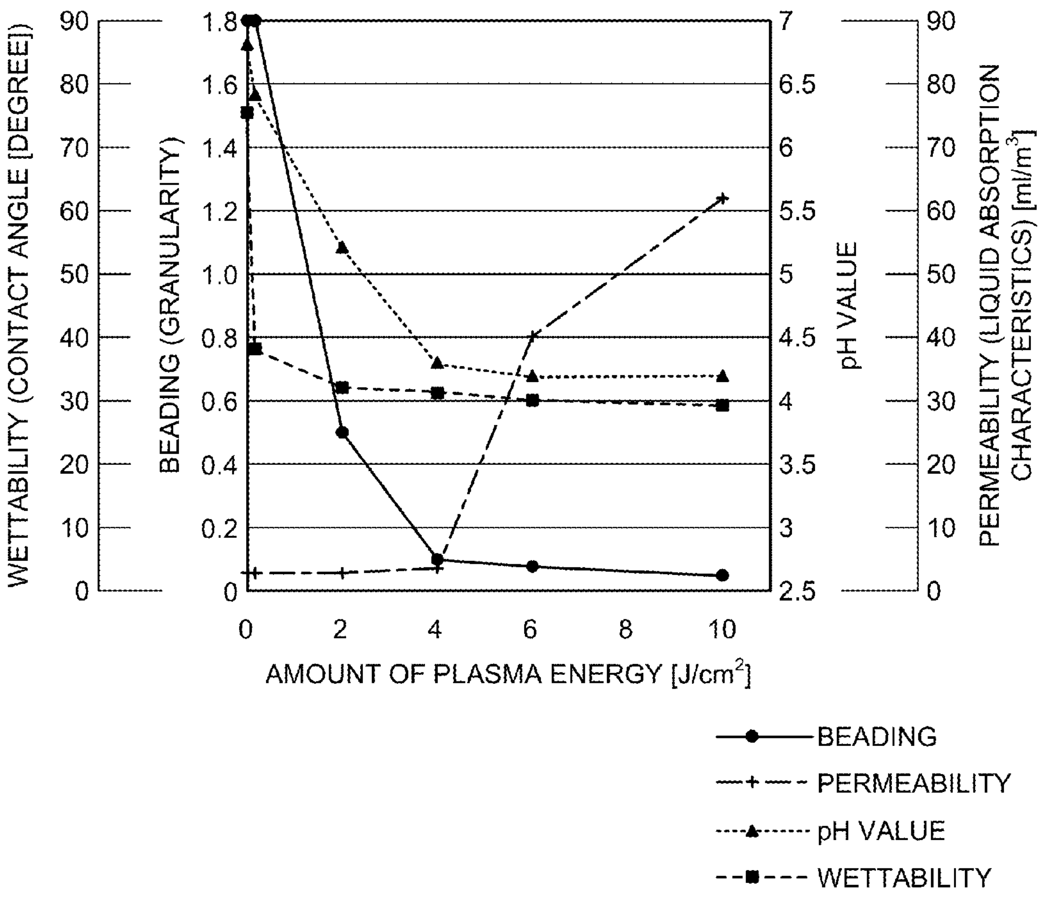
FIG. 7 is a graph of the relation between the amount of plasma energy and the wettability, the beading, the pH value, and the permeability of the surface of the processing target according to the embodiment.

FIG. 7 is a graph of the relation between the amount of plasma energy and the wettability, the beading, the pH value, and the permeability of the surface of the processing target according to the embodiment. FIG. 7 illustrates how surface characteristics (the wettability, beading, the pH value, and the permeability (liquid absorption characteristics)) change depending on the amount of plasma energy in a case where printing is performed on coated paper serving as the processing target 20. To obtain the evaluation illustrated in FIG. 7, an aqueous pigment ink having characteristics of pigments aggregating with acid (an alkaline ink in which negatively charged pigments are dispersed) was used as the ink.

As illustrated in FIG. 7, the wettability of the surface of the coated paper is drastically improved with a small amount of plasma energy (e.g., equal to or smaller than approximately 0.2 $J/cm^2$). A larger amount of energy no more improves the wettability. By contrast, the pH value of the surface of the coated paper decreases to a certain extent as the amount of plasma energy increases. The pH value, however, is saturated when the amount of plasma energy exceeds a certain value (e.g., approximately 4 $J/cm^2$). The permeability (liquid absorption characteristics) is drastically improved at about the point where the decrease in pH is saturated (e.g., approximately 4 $J/cm^2$). This phenomenon, however, varies depending on polymer components included in the ink.

As a result of this, the value of beading (granularity) is extremely improved when the permeability (liquid absorption characteristics) starts to be improved (e.g., approximately 4 $J/cm^2$). The beading (granularity) is a numerical value indicating roughness of an image and indicates variation in the density with a standard deviation of an average density. In FIG. 7, a plurality of densities in a solid image formed of dots of two or more colors are sampled, and a standard deviation of the densities is indicated as the beading (granularity). As described above, the ink ejected onto the coated paper subjected to the plasma processing according to the embodiment spreads into a perfect circle and permeates while aggregating, thereby improving the beading (granularity) of the image.

In terms of the relation between the characteristics of the surface of the processing target 20 and the image quality, the improved wettability of the surface improves the circularity of a dot. This is considered because increased roughness of the surface and the generated hydrophilic polar functional group by the plasma processing improve and uniformize the wettability of the surface of the processing target 20. It is also considered as one factor that the plasma processing removes a water-repellent factor, such as dust, oil, and calcium carbonate, on the surface of the processing target 20. In other words, the wettability of the surface of the processing target 20 is improved and unstable factors are removed from the surface of the processing target 20. Therefore, a droplet uniformly spreads in the circumferential direction, thereby increasing the circularity of a dot.

Acidification (reduction in pH) of the surface of the processing target 20 causes the ink pigments to aggregate, improves the permeability, and causes the vehicle to permeate into the coating layer. These phenomena increase the pigment density on the surface of the processing target 20, making it possible to suppress movement of the pigments even if dots unite. This suppresses mixture of the pigments and enables the pigments to uniformly precipitate and aggregate on the surface of the processing target 20. The effects of suppressing mixture of the pigments vary depending on the components of the ink and the amount of an ink droplet. In a case where the amount of an ink droplet is small, mixture of the pigments caused by union of dots is less likely to occur compared with the case of a large droplet. This is because a smaller amount of vehicle can be dried and permeate more quickly and enables the pigments to aggregate with a small pH reaction. The effects of the plasma processing vary depending on the type of the processing target 20 and the environment (e.g., humidity). Therefore, the amount of plasma energy in the plasma processing may be controlled to an optimum value depending on the amount of an droplet, the type of the processing target 20, and the environment. This may possibly increase the reforming efficiency on the surface of the processing target 20, thereby achieving further energy saving.

Figure 8:
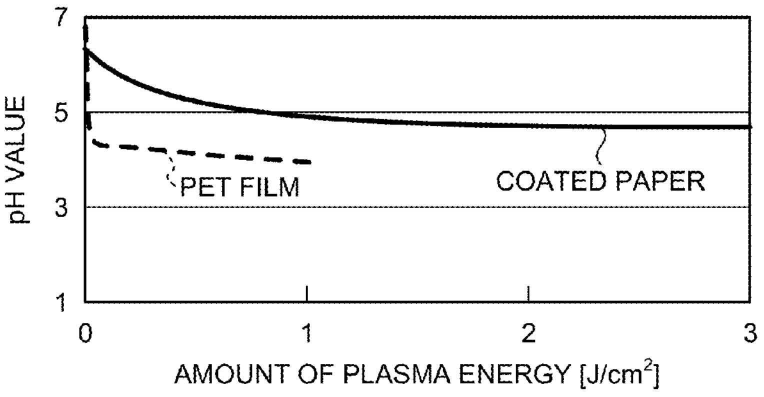
FIG. 8 is a diagram of an example of the relation between the amount of plasma energy and the pH value of the surface of the processing target of each medium.

FIG. 8 is a graph of the relation between the amount of plasma energy and pH according to the embodiment. While pH is typically measured in a solution, pH on the surface of a solid can be measured in recent years. Examples of measuring instruments may include pH meter B-21 manufactured by HORIBA, Ltd.

In FIG. 8, the solid line indicates the plasma energy dependency of the pH value of coated paper, whereas the dotted line indicates the plasma energy dependency of the pH value of a polyethylene terephthalate (PET) film. As illustrated in FIG. 8, the PET film is acidified by a smaller amount of plasma energy than that of the coated paper. The amount of plasma energy to acidify the coated paper was also equal to or smaller than approximately 3 $J/cm^2$. In a case where an inkjet processing apparatus that ejects an alkaline aqueous pigment ink recorded an image on the processing target 20 whose pH value is lowered to equal to or lower than 5, a dot of the formed image was made into a shape close to a perfect circle. Furthermore, there was no mixture of pigments caused by union of dots, and an excellent image with no bleeding was provided (refer to FIG. 5).

A processing target reforming apparatus, a printing apparatus, a printing system, and a method according to the embodiment of the present invention will be described in greater detail with reference to the accompanying drawings.

While the present embodiment describes an image forming apparatus including a discharging head (a recording head or an ink head) of four colors, which are black (K), cyan (C), magenta (M), and yellow (Y), the discharging head is not limited thereto. In other words, the image forming apparatus may further include a discharging head corresponding to green (G), red (R), and other colors and a discharging head of black (K) alone. In the description below, K, C, M, and Y correspond to black, cyan, magenta, and yellow, respectively.

While continuous paper wound in a roll (hereinafter, referred to as rolled paper) is used as a processing target in the present embodiment, the processing target is not limited thereto. Any recording medium on which an image can be formed, such as a cut sheet, may be used. Examples of the type of paper may include plain paper, high-quality paper, recycled paper, thin paper, thick paper, and coated paper. Examples of the processing target may further include an overhead projector (OHP) sheet, a synthetic resin film, a metal thin film, and a material on which an image can be formed with ink. The present invention is more effectively used in a case where the paper is impermeable paper or slow-permeable paper, such as coated paper. The rolled paper may be continuous paper (a continuous sheet or a continuous form) on which cuttable perforations are formed at predetermined intervals. In this case, a page in the rolled paper corresponds to an area sandwiched between the perforations formed at the predetermined intervals, for example.

Figure 9:
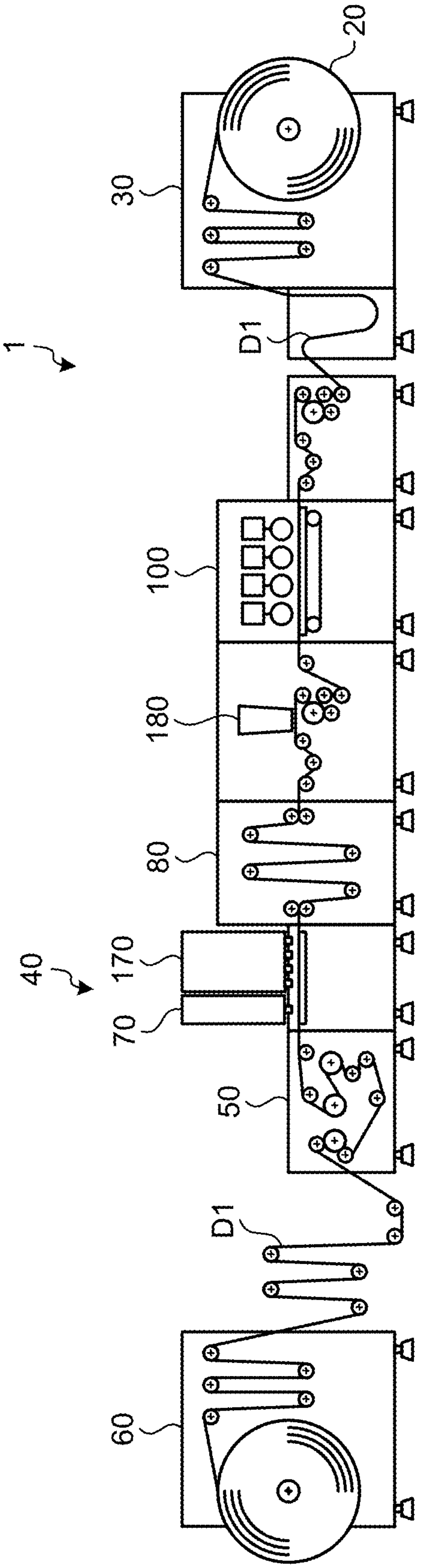
FIG. 9 is a schematic of a configuration of a printing apparatus (system) according to the embodiment.

FIG. 9 is a schematic of a configuration of the printing apparatus (system) according to the present embodiment. As illustrated in FIG. 9, a printing apparatus (system) 1 includes a carrying-in unit 30, a plasma processing apparatus 100, and an image forming apparatus 40. The carrying-in unit 30 carries in (conveys) the processing target 20 (rolled paper) along a conveyance path D1. The plasma processing apparatus 100 performs plasma processing on the carried-in processing target 20 as preprocessing. The image forming apparatus 40 forms an image on the surface of the processing target 20 subjected to the plasma processing. These apparatuses may be provided in respective different housings and collectively constitute the system or may be accommodated in a single housing to constitute the printing apparatus. In the case where the apparatuses constitute the printing system, a control unit that controls the whole or a part of the system may be included in any one of the apparatuses or provided to another independent housing.

A buffer 80 is provided between the plasma processing apparatus 100 and an inkjet recording apparatus 170. The buffer 80 adjusts the feed rate of the processing target 20 subjected to preprocessing, such as plasma processing, to the inkjet recording apparatus 170. The image forming apparatus 40 includes the inkjet recording apparatus 170 that forms an image by performing inkjet processing on the processing target 20 subjected to plasma processing. The image forming apparatus 40 may further include a post-processing unit 70 that performs post-processing on the processing target 20 on which an image is formed.

The printing apparatus (system) 1 may further include a drying unit 50 and a carrying-out unit 60. The drying unit 50 dries the processing target 20 subjected to post-processing. The carrying-out unit 60 carries out the processing target 20 on which an image is formed (and subjected to post-processing in some cases). The printing apparatus (system) 1 may further include a pre-application processing unit (not illustrated) as a preprocessing unit that performs preprocessing on the processing target 20 besides the plasma processing apparatus 100. The pre-application processing unit applies a processing liquid called a pre-applied agent containing a polymer material to the surface of the processing target 20. The printing apparatus (system) 1 may further include a pH detecting unit 180 between the plasma processing apparatus 100 and the image forming apparatus 40. The pH detecting unit 180 detects the pH value of the surface of the processing target 20 subjected to preprocessing performed by the plasma processing apparatus 100.

The printing apparatus (system) 1 further includes a control unit (not illustrated) that controls operations of each unit. The control unit may be connected to a printing control device that generates raster data from image data to be printed, for example. The printing control device may be provided in the printing apparatus (system) 1 or externally provided via a network, such as the Internet and a local area network (LAN).

In the embodiment, the printing apparatus (system) 1 illustrated in FIG. 9 performs acidification to acidify the surface of a processing target before performing inkjet recording as described above. Acidification may be carried out by atmospheric non-equilibrium plasma processing using dielectric barrier discharge, for example. Because acidification with atmospheric non-equilibrium plasma has an extremely high electron temperature and a gas temperature at nearly normal temperature, it is one of preferable plasma processing methods for a processing target, such as a recording medium.

To stably generate atmospheric non-equilibrium plasma in a wide range, atmospheric non-equilibrium plasma processing employing dielectric barrier discharge with streamer breakdown is preferably performed. Dielectric barrier discharge with streamer breakdown can be caused by applying an alternating high voltage between electrodes covered with a dielectric, for example.

Besides the dielectric barrier discharge with streamer breakdown, various methods may be used to generate atmospheric non-equilibrium plasma. Examples of the methods may include dielectric barrier discharge in which an insulator, such as a dielectric, is inserted between electrodes, corona discharge in which a significant non-uniform electric field is formed in a thin metal wire, and pulse discharge in which a short pulse voltage is applied. Two or more of these methods may be combined.

Figure 10:
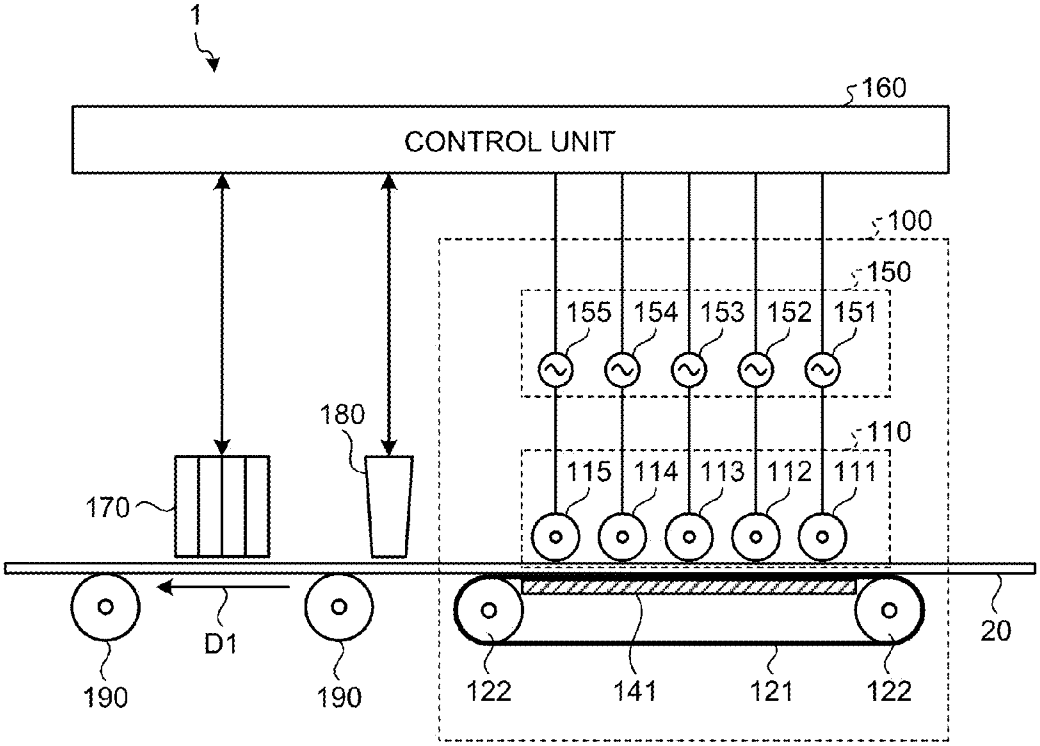
FIG. 10 is a schematic in which a configuration from the plasma processing apparatus to an inkjet recording apparatus in the printing apparatus (system) according to the embodiment is extracted to illustrate.

FIG. 10 is illustrated such that the configuration from the plasma processing apparatus 100 to the inkjet recording apparatus 170 in the printing apparatus (system) 1 illustrated in FIG. 9 is extracted to illustrate. As illustrated in FIG. 10, the printing apparatus (system) 1 includes the plasma processing apparatus 100, the pH detecting unit 180, the inkjet recording apparatus 170, and a control unit 160. The plasma processing apparatus 100 performs plasma processing on the surface of the processing target 20. The pH detecting unit 180 measures the pH value of the surface of the processing target 20. The inkjet recording apparatus 170 forms an image by performing inkjet recording on the processing target 20. The control unit 160 collectively controls the printing apparatus (system) 1. The printing apparatus (system) 1 further includes carriage rollers 190 that convey the processing target 20 along the conveyance path D1. The carriage rollers 190 drive to rotate under the control of the control unit 160, for example, thereby conveying the processing target 20 along the conveyance path D1.

Similarly to the atmospheric non-equilibrium plasma processing apparatus 10 illustrated in FIG. 2, the plasma processing apparatus 100 includes a discharge electrode 110, a counter electrode 141, a high-frequency high-voltage power source 150, and a dielectric belt 121 sandwiched between the electrodes. In FIG. 10, the discharge electrode 110 includes five discharge electrodes 111 to 115. The counter electrode 141 is provided to the whole range facing the discharge electrodes 111 to 115 with the dielectric belt 121 interposed therebetween. The high-frequency high-voltage power source 150 includes five high-frequency high-voltage power sources 151 to 155 corresponding to the number of five discharge electrodes 111 to 115.

An endless belt is suitably used as the dielectric belt 121 to also provide a function of conveying the processing target 20. The plasma processing apparatus 100 further includes rotating rollers 122 that move the dielectric belt 121 to convey the processing target 20. The rotating rollers 122 drive to rotate based on an instruction from the control unit 160, thereby moving the dielectric belt 121. Thus, the processing target 20 is conveyed along the conveyance path D1.

The control unit 160 can turn on/off the high-frequency high-voltage power sources 151 to 155 individually. The control unit 160 can also adjust the pulse intensity of a high-frequency and high-voltage pulse supplied from the high-frequency high-voltage power sources 151 to 155 to the discharge electrodes 111 to 115, respectively.

The pH detecting unit 180 is arranged on the downstream of the plasma processing apparatus 100 and a pre-application processing apparatus (not illustrated). The pH detecting unit 180 may detect the pH value of the surface of the processing target 20 subjected to preprocessing (acidification) performed by any one or both of the plasma processing apparatus 100 and the pre-application processing apparatus and input the pH value to the control unit 160. Based on the pH value received from the pH detecting unit 180, the control unit 160 may perform feedback control on any one or both of the plasma processing apparatus 100 and the pre-application processing apparatus (not illustrated), thereby adjusting the pH value of the surface of the processing target 20 subjected to preprocessing.

The amount of plasma energy required for plasma processing can be derived from a voltage value and an application time of the high-frequency and high-voltage pulse supplied from the high-frequency high-voltage power sources 151 to 155 to the discharge electrodes 111 to 115, respectively, and from an electric current flowing through the processing target 20 at that time. The amount of plasma energy required for plasma processing is controlled as an amount of energy not for each of the discharge electrodes 111 to 115 but for the entire discharge electrode 110.

The processing target 20 passes between the discharge electrode 110 and the dielectric belt 121 while the plasma processing apparatus 100 is generating plasma, thereby being subjected to plasma processing. This breaks chains of binder resin on the surface of the processing target 20 and causes oxygen radicals and ozone in a vapor phase to recombine with polymers. As a result, a polar functional group is generated on the surface of the processing target 20. Thus, hydrophilicity and acidity are provided to the surface of the processing target 20. While the plasma processing is performed in the atmosphere in the present embodiment, it may be performed in a gas atmosphere, such as nitrogen and a rare gas.

The discharge electrodes 111 to 115 are effectively used to uniformly acidify the surface of the processing target 20. At the same conveyance speed (or printing speed), for example, a time in which the processing target 20 passes through a plasma space can be made longer in acidification performed by a plurality of discharge electrodes than in acidification performed by one discharge electrode. As a result, a plurality of discharge electrodes can perform acidification more uniformly on the surface of the processing target 20.

The inkjet recording apparatus 170 includes an inkjet head. To increase the printing speed, for example, the inkjet head includes a plurality of heads of same colors (e.g., four heads of four colors). To form an image at high speed and high resolution (e.g., 1200 dpi), ink ejecting nozzles in the heads of the respective colors are fixed in a displaced manner so as to correct gaps therebetween. The inkjet head can be driven at a plurality of drive frequencies such that a dot (droplet) of the ink ejected from each nozzle satisfies three types of capacities called a large droplet, a medium droplet, and a small droplet.

An inkjet head 171 is arranged on the downstream of the plasma processing apparatus 100 on the conveyance path of the processing target 20. Under the control of the control unit 160, the inkjet recording apparatus 170 ejects inks onto the processing target 20 subjected to preprocessing (acidification) performed by the plasma processing apparatus 100, thereby forming an image.

As illustrated in FIG. 10, the inkjet head of the inkjet recording apparatus 170 may include a plurality of heads of same colors (four heads of four colors). This configuration can increase the speed of inkjet recording. To achieve resolution of 1200 dpi at high speed, for example, the heads of the respective colors in the inkjet head are fixed in a displaced manner so as to correct gaps between the nozzles that eject the respective inks. The head of each color receives a drive pulse at a drive frequency having several variations such that a dot of the ink ejected from its nozzle satisfies the three types of capacities called a large droplet, a medium droplet, and a small droplet.

The discharge electrodes 111 to 115 are also effectively used to perform plasma processing uniformly on the surface of the processing target 20. At the same conveyance speed (or printing speed), for example, a time in which the processing target 20 passes through the plasma space can be made longer in plasma processing performed by a plurality of discharge electrodes than in plasma processing performed by one discharge electrode. As a result, a plurality of discharge electrodes can perform plasma processing more uniformly on the surface of the processing target 20.

A discharge operation performed by the plasma processing apparatus 100 in FIG. 10 will be described in greater detail with reference to the accompanying drawings. To simplify the description, suppose that the number of discharge electrodes 110 is two, and the discharge electrodes 111 and 112 share the high-frequency high-voltage power source 150.

Figure 11:
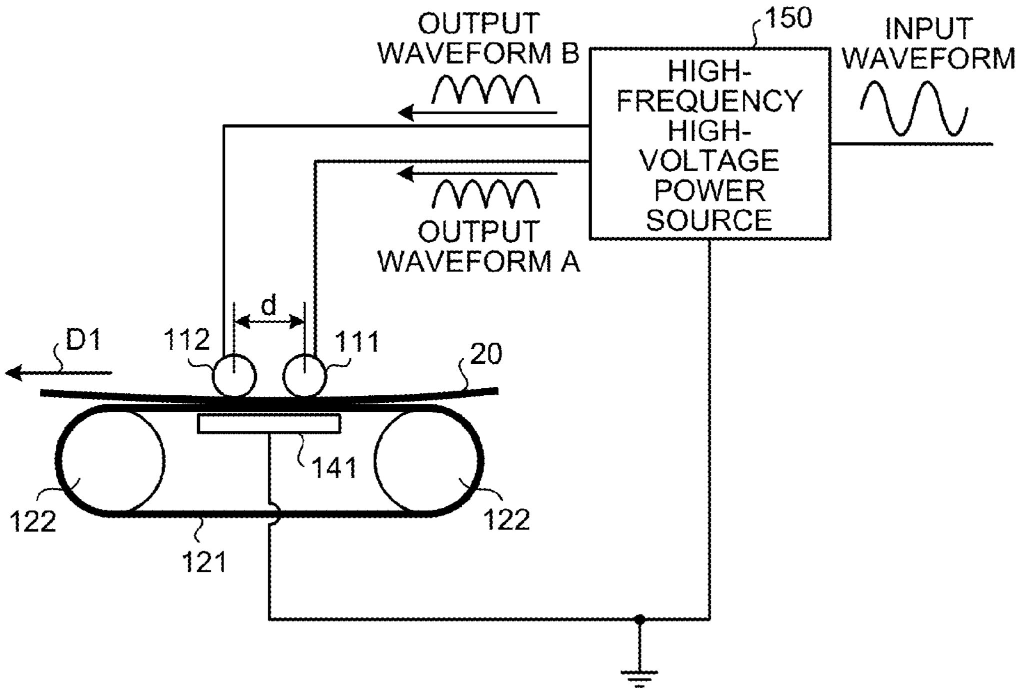
FIG. 11 is a schematic of an exemplary configuration of the plasma processing apparatus according to the embodiment.

FIG. 11 is a schematic of an exemplary configuration of the plasma processing apparatus used for the explanation. In the discharge electrodes 111 and 112 illustrated in FIG. 11, a metal part may be exposed or covered with a dielectric or an insulator, such as an insulation rubber and a ceramic. In this description, the discharge electrodes 111 and 112 each have a roller-like cross-sectional shape. The discharge electrodes 111 and 112 come into contact with the processing target 20 to rotate in association with conveyance of the processing target 20. The configuration is not limited thereto. The discharge electrodes 111 and 112 may be separated from the processing target 20 by approximately several millimeters, for example. In this case, the cross-sectional shape of the discharge electrodes 111 and 112 may be an elongated shape like a wire or a substantially triangle blade shape tapering toward the counter electrode 141.

Figure 12:
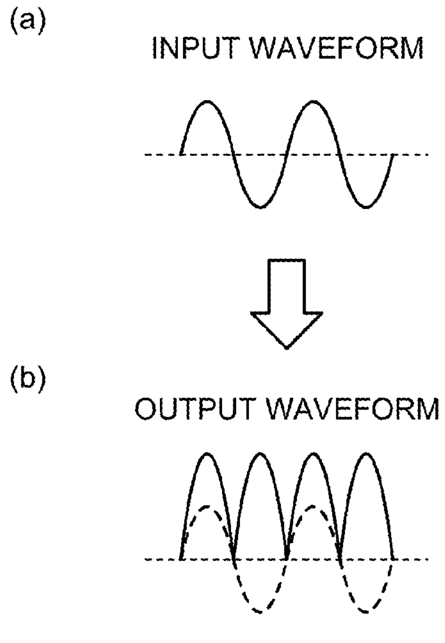
FIG. 12 is a diagram of an example of an input waveform and an output waveform of a voltage pulse input to and output from a high-frequency high-voltage power source according to the embodiment.

The high-frequency high-voltage power source 150 raises and rectifies an alternating-current (AC) voltage (input waveform) input from an AC power source, thereby generating high-frequency and high-voltage pulses (output waveforms A and B) applied to the respective discharge electrodes 111 and 112. FIG. 12 is a diagram of an example of an input waveform and an output waveform of voltage pulses input to and output from the high-frequency high-voltage power source. As illustrated in FIG. 12(*a*), the high-frequency high-voltage power source 150 receives an AC voltage waveform, which is a sinusoidal AC waveform, as an input waveform. As illustrated in FIG. 12(*b*), the high-frequency high-voltage power source 150 raises the received input waveform with a transformer or the like and converts the input waveform into a positive voltage waveform with a rectifying circuit or the like to output the waveform as an output waveform. In a case where the frequency of the input waveform is 50 Hz, for example, the period of the output waveform is 1/(50×2)=0.01 s. The period of the output waveform may possibly cause processing unevenness in plasma processing. To reduce occurrence of processing unevenness, the present embodiment controls the phase of the output waveform supplied to each of the discharge electrodes 110. In the description below, the output waveforms A and B input to the discharge electrodes 111 and 112 are referred to as applied voltage waveforms A and B, respectively. Processing unevenness in plasma processing is caused by variations in the amount of plasma energy supplied to the surface of the processing target 20 depending on the position. In the present embodiment, the processing unevenness occurs as unevenness in the pH value on the surface of the processing target 20, for example. The processing unevenness has a period coinciding with that of the applied voltage waveforms, for example.

Figure 13:
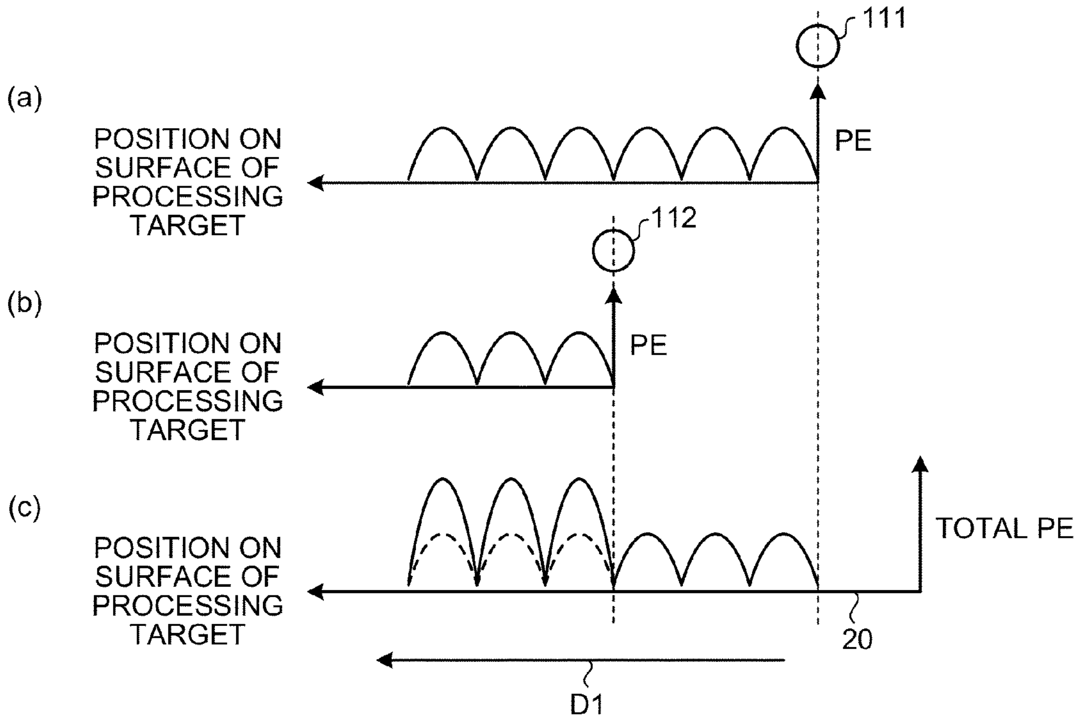
FIG. 13 is a diagram for explaining a typical example of a case where processing unevenness occurs in plasma processing.

FIG. 13 is a diagram for explaining a typical example of a case where processing unevenness occurs in plasma processing. In FIG. 13, positions are aligned between (a) to (c) based on a position on the surface of the processing target 20. In FIG. 13, the abscissa indicates the position on the surface of the processing target. In FIGS. 13(*a*) and 13(*b*), the ordinate indicates the amount of plasma energy (PE) supplied to the surface of the processing target. In FIG. 13(*c*), the ordinate indicates the total amount of plasma energy (total PE) supplied to the surface of the processing target.

As illustrated in FIG. 13, the processing target 20 is conveyed from the right to the left in FIG. 13 along the conveyance path D1. First, the processing target 20 being conveyed is subjected to plasma processing performed by the discharge electrode 111. This processing gives the surface of the processing target 20 an amount of plasma energy corresponding to the applied voltage waveform A (refer to FIG. 11) as illustrated in FIG. 13(*a*).

Subsequently, the processing target 20 being conveyed is subjected to plasma processing performed by the discharge electrode 112. This processing gives the surface of the processing target 20 an amount of plasma energy corresponding to the applied voltage waveform B (refer to FIG. 11) as illustrated in FIG. 13(*b*). Therefore, the surface of the processing target 20 is supplied with the total amount of plasma energy obtained by adding up the amount of plasma energy illustrated in FIG. 13(*a*) and the amount of plasma energy illustrated in FIG. 13(*b*).

If the phase of the applied voltage waveform A and that of the applied voltage waveform B coincide with each other with respect to the surface of the processing target 20, for example, the peaks of the applied voltage waveform A and those of the applied voltage waveform B coincide with each other as illustrated in FIG. 13(*c*). In the range subjected to the plasma processing performed by both of the discharge electrodes 111 and 112, unevenness of a period coinciding with the period of the applied voltage waveform occurs in the total amount of plasma energy supplied to the surface of the processing target 20. Such processing unevenness generates a portion with high hydrophilicity and a portion with low hydrophilicity, thereby reducing the quality of a formed image.

Figure 14:
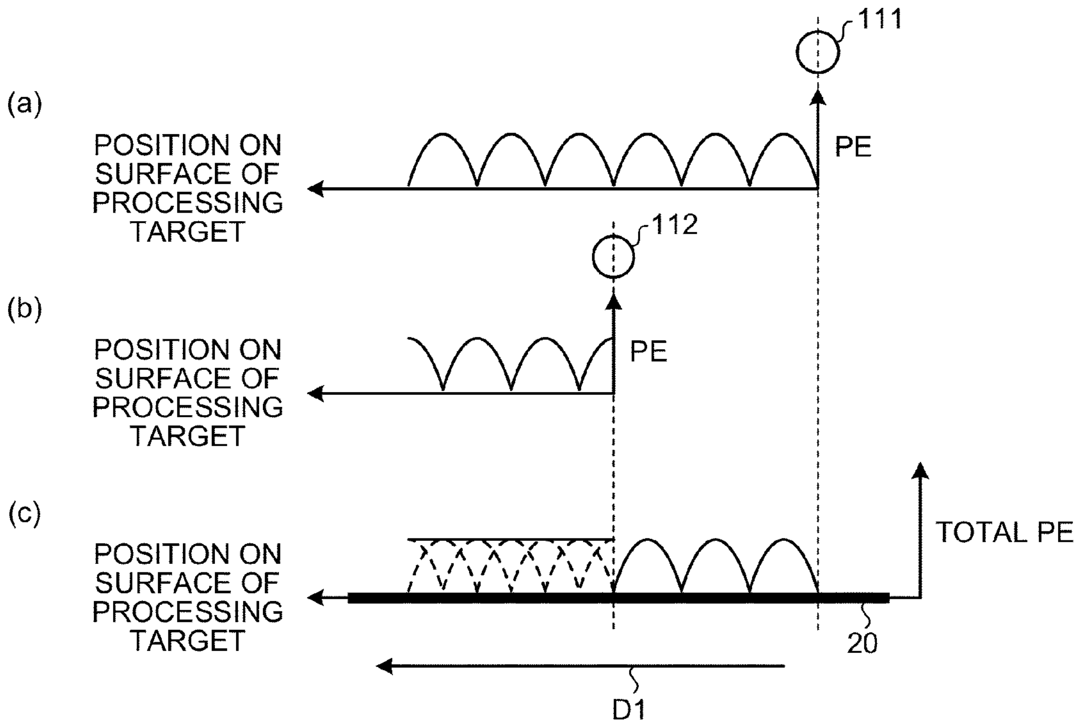
FIG. 14 is a diagram for explaining a typical example of a case where processing unevenness in plasma processing is reduced.

FIG. 14 is a diagram for explaining a typical example of a case where processing unevenness in plasma processing is reduced. Similarly to FIG. 13, in FIG. 14, positions are aligned between (a) to (c) based on a position on the surface of the processing target 20. In FIG. 14, the abscissa indicates the position on the surface of the processing target. In FIGS. 14(*a*) and 14(*b*), the ordinate indicates the amount of plasma energy (PE) supplied to the surface of the processing target. In FIG. 14(*c*), the ordinate indicates the total amount of plasma energy (total PE) supplied to the surface of the processing target.

As illustrated in FIG. 14, the processing target 20 is being conveyed from the right to the left in FIG. 14 along the conveyance path D1. First, the surface of the processing target 20 being conveyed is supplied with an amount of plasma energy corresponding to the applied voltage waveform A (refer to FIG. 11) as illustrated in FIG. 14(*a*). Subsequently, the surface of the processing target 20 being conveyed is supplied with an amount of plasma energy corresponding to the applied voltage waveform B (refer to FIG. 11) as illustrated in FIG. 14(*b*). If the phase of the applied voltage waveform A is shifted with respect to that of the applied voltage waveform B by a half period, for example, a waveform obtained by combining the applied voltage waveform A and the applied voltage waveform B is a waveform of constant output as illustrated in FIG. 14(*c*). Thus, it is possible to supply a fixed amount of plasma energy to the surface of the processing target 20. This can reduce processing unevenness and generation of a portion with high hydrophilicity and a portion with low hydrophilicity, thereby improving the quality of a formed image.

Table 1 indicates a period of processing unevenness and a waveform period to be shifted to reduce the processing unevenness (hereinafter, referred to as a phase adjustment amount) in a case where the number of used electrodes is two. As indicated in Table 1, in a case where an AC input frequency f is 50 Hz, an input waveform period 1/f is 0.02 seconds. An output waveform period 1/(f×2) is 0.01 seconds, which corresponds to the period of the processing unevenness.

TABLE 1

| | | |
|---|---|---|
| AC input frequency [Hz] | f | 50.00 |
| AC input period [s] | 1/f | 0.02 |
| AC output period (processing unevenness period) [s] | 1/(f × 2) | 0.01 |
| Number of electrodes [electrode] | N | 2 |
| Waveform period shifted to reduce processing unevenness (phase adjustment amount) [period] | 1/N | 0.50 |

If a distance d between the discharge electrodes 110 (refer to FIG. 11) is not considered, the phase adjustment amount is represented by 1/N. In a case where the number of used electrodes N is two, the waveform period to be shifted is 0.5. In other words, by shifting the periods of applied voltage waveforms applied to the two discharge electrodes 110 by 0.5 periods, processing unevenness can be reduced. Naturally, the number of used electrodes N is not limited two. The increased number of used electrodes increases the number of times of plasma processing performed on the processing target 20. This increases the processing effects, making it possible to further reduce processing unevenness, for example.

Table 2 indicates the phase adjustment amount in a case where processing conditions of the plasma processing are changed. As illustrated in Table 2, the processing conditions include a conveyance speed (mm/s) of the processing target 20, a pitch of processing unevenness (mm) caused by the discharge electrode 111 arranged on the upstream, and an inter-electrode distance (mm) between the two discharge electrodes 111 and 112. Based on these conditions, the following factors are derived as indicated in Table 2: an inter-electrode movement time (s) required for a single point on the processing target 20 to move from the discharge electrode 111 to the discharge electrode 112; the number of periods of processing unevenness (period) formed on the surface of the processing target 20 from the discharge electrode 111 arranged on the upstream to the discharge electrode 112 arranged on the downstream; deviation (inter-waveform deviation period) (period) between the applied voltage waveforms A and B input to the discharge electrodes 111 and 112, respectively, when the same point on the processing target 20 passes; and the degree of the phase adjustment amount required to reduce the processing unevenness the most. Finally, the phase adjustment amount (period) required to reduce the processing unevenness the most is derived.

TABLE 2

| | | Condition (01) | Condition (02) | Condition (03) | Condition (04) | Condition (05) | Condition (06) |
|---|---|---|---|---|---|---|---|
| Conveyance speed [mm/s] | V | 200 | 300 | 400 | 500 | 600 | 700 |
| Processing unevenness pitch [mm] | V/(f × 2) | 2.00 | 3.00 | 4.00 | 5.00 | 6.00 | 7.00 |
| Inter-electrode distance [mm] | B | 6.0 | 6.0 | 6.0 | 6.0 | 6.0 | 6.0 |
| Inter-electrode movement time [s] | B/V | 0.030 | 0.020 | 0.015 | 0.012 | 0.010 | 0.009 |
| Number of periods of processing unevenness between electrodes [period] | X = (B × f × 2) | 3.00 | 2.00 | 1.50 | 1.20 | 1.00 | 0.86 |
| Inter-waveform deviation period [period] | Xs (fractional portion of X) | 0.00 | 0.00 | 0.50 | 0.20 | 0.00 | 0.86 |
| Required phase adjustment amount [period] | | Large ↓ | Large ↓ | None ↓ | Small ↓ | Large ↓ | small ↓ |
| Phase adjustment amount [period] | 1/N − Xs | 0.50 | 0.50 | 0.00 | 0.30 | 0.50 | −0.36 |

Assume f (Hz) denotes the AC input frequency of the input waveform, V (mm/s) denotes the conveyance speed of the processing target 20, and B (mm) denotes the inter-electrode distance between the two discharge electrodes 111 and 112, the number of periods X (period) of processing unevenness between the electrodes is expressed by Equation (1):

$$X=(B\times f\times 2)/V\text{(period)} \quad (1)$$

In a case where the AC input frequency is set to 50 Hz, the conveyance speed is set to 200 mm/s, and the inter-electrode distance is set to 6 mm as indicated in Table 1 and the condition (01) in Table 2, the number of periods X (period) of processing unevenness between the electrodes is determined to be 3.0 periods based on Equation (1).

Because X is an integer and a fractional portion Xs is 0.0, there is no deviation in the waveform period between the discharge electrode 111 and the discharge electrode 112. This causes processing unevenness on the surface of the processing target 20 as illustrated in FIG. 13. To reduce the processing unevenness as illustrated in FIG. 14, it is necessary to shift the phase of the applied voltage waveform A or B input to the discharge electrode 111 or 112 by 0.5 periods (=1/N−Xs). In other words, a phase adjustment amount Y (period) under the condition (01) is 0.5 periods. Table 2 also indicates the phase adjustment amount Y (period) for the conditions (02) to (06) determined in a similar manner.

In Table 2, the conditions (01), (02), and (05) have large processing unevenness because there is no deviation between the applied voltage waveforms A and B input to the two discharge electrodes 111 and 112, respectively. By contrast, the conditions (04) and (06) have small processing unevenness because there is a little deviation of the applied voltage waveform A or B. The condition (03) has no processing unevenness because the deviation of the applied voltage waveform A or B is exactly 0.5 periods.

A configuration to shift the phase between the applied voltage waveforms input to the discharge electrodes 111 and 112 will be described in greater detail with reference to the accompanying drawings. Various methods can be employed to shift the phase of the applied voltage waveform input to the discharge electrodes 111 and 112, including a method of shifting an application timing of the voltage waveform input to the discharge electrodes 111 and 112 and a method of changing the inter-electrode distance between the two discharge electrodes 111 and 112. The following describes a method of shifting an application timing of the voltage waveform input to the discharge electrodes 111 and 112 as a first example and a method of changing the inter-electrode distance between the two discharge electrodes 111 and 112 as a second example.

First Example

Figure 15:
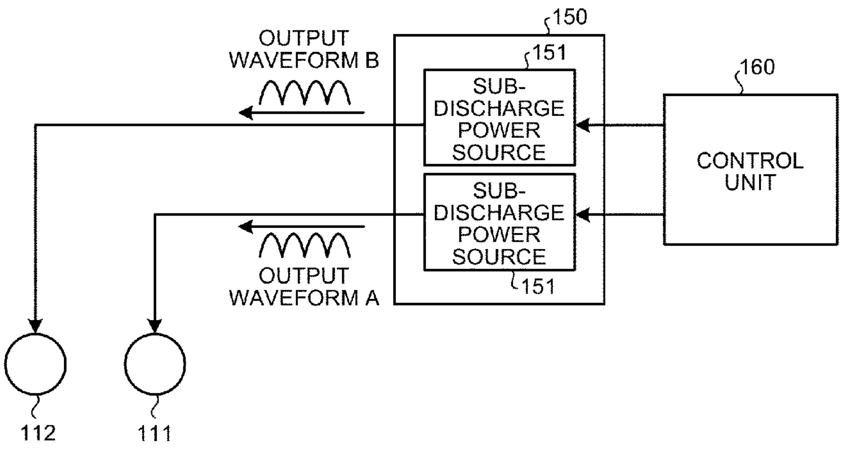
FIG. 15 is a schematic of a configuration of a discharge unit in a plasma processing apparatus according to a first example of the embodiment.

FIG. 15 is a schematic of a configuration of a discharge unit in a plasma processing apparatus according to the first example. FIG. 15 is illustrated such that the number of discharge electrodes 110 is two, and components required for the explanation are extracted.

As illustrated in FIG. 15, a high-frequency high-voltage power source 150 of the discharge unit according to the first example includes high-frequency high-voltage power sources (sub-discharge power sources) 151 and 152 for discharge electrodes 111 and 112, respectively. A control unit 160 shifts timings at which the sub-discharge power sources 151 and 152 output the output waveform A or B, thereby reducing processing unevenness. The phase adjustment amount Y may be calculated by the method described above with reference to Table 1 and Table 2.

Figure 16:
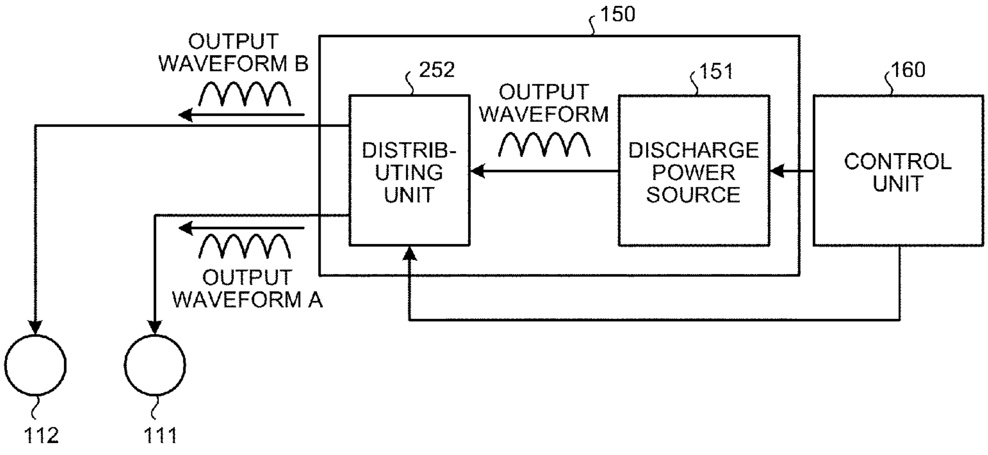
FIG. 16 is a schematic of a modification of the discharge unit according to the first example illustrated in FIG. 15.

FIG. 16 is a schematic of a modification of the discharge unit according to the first example illustrated in FIG. 15. As illustrated in FIG. 16, the configuration to shift timings at which the discharge electrodes 111 and 112 receive the applied voltage waveforms may input an output waveform output from a high-frequency high-voltage power source 151 to the discharge electrodes 111 and 112 via a distributing unit 252. In this case, the control unit 160 controls the distributing unit 252 so as to delay the output waveform A or B input to the discharge electrode 111 or 112, thereby reducing processing unevenness. The phase adjustment amount Y may be calculated by the method described above with reference to Table 1 and Table 2.

Second Example

Figure 17:
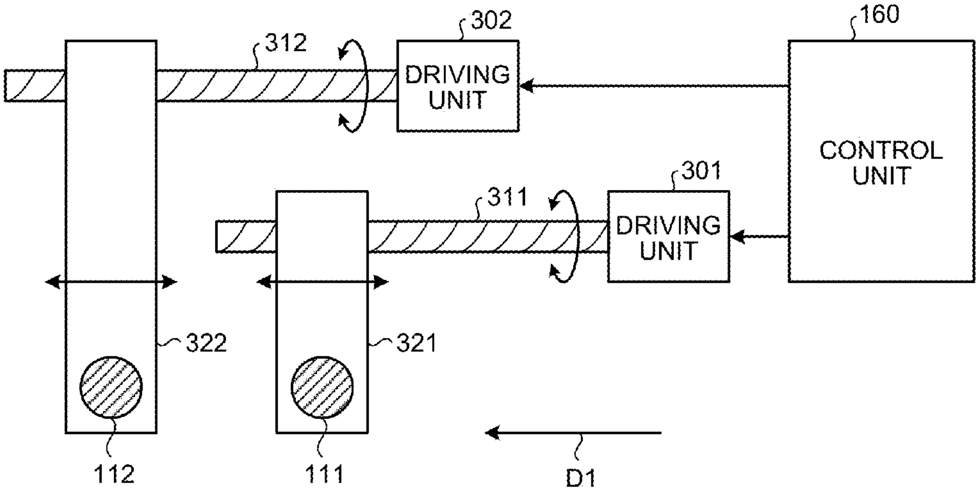
FIG. 17 is a schematic of a configuration of a discharge unit in a plasma processing apparatus according to a second example of the embodiment.

FIG. 17 is a schematic of a configuration of a discharge unit in a plasma processing apparatus according to the second example. FIG. 17 is illustrated such that the number of discharge electrodes 110 is two, and components required for the explanation are extracted.

As illustrated in FIG. 17, the discharge unit according to the second example includes a guide arm 311, a holding arm 321, and a driving unit 301 as a moving mechanism that moves a discharge electrode 111 along the conveyance path D1. The guide arm 311 extends along the conveyance path D1. The holding arm 321 can move along the guide arm 311. The driving unit 301 drives the guide arm 311, thereby moving the holding arm 321 along the conveyance path D1. The discharge unit also includes a guide arm 312, a holding arm 322, and a driving unit 302 as a moving mechanism that moves a discharge electrode 112 along the conveyance path D1. The guide arm 312 extends in a direction parallel to the guide arm 311 along the conveyance path D1. The holding arm 322 can move along the guide arm 312. The driving unit 302 drives the guide arm 312, thereby moving the holding arm 322 along the conveyance path D1.

The guide arms 311 and 312 may be a screw member on which a helical groove is formed, for example. In this case, the holding arm 321 or 322 with the discharge electrode 111 or 112 attached on the tip thereof is attached to the guide arm 311 or 312 as follows: the holding arm 321 or 322 moves along the conveyance path D1 with rotation of the guide arm 311 or 312 while maintaining its orientation. A control unit 160 drives the driving unit 301 or 302 to rotate the guide arm 311 or 312, thereby adjusting the inter-electrode distance between the discharge electrodes 111 and 112.

Figure 18:
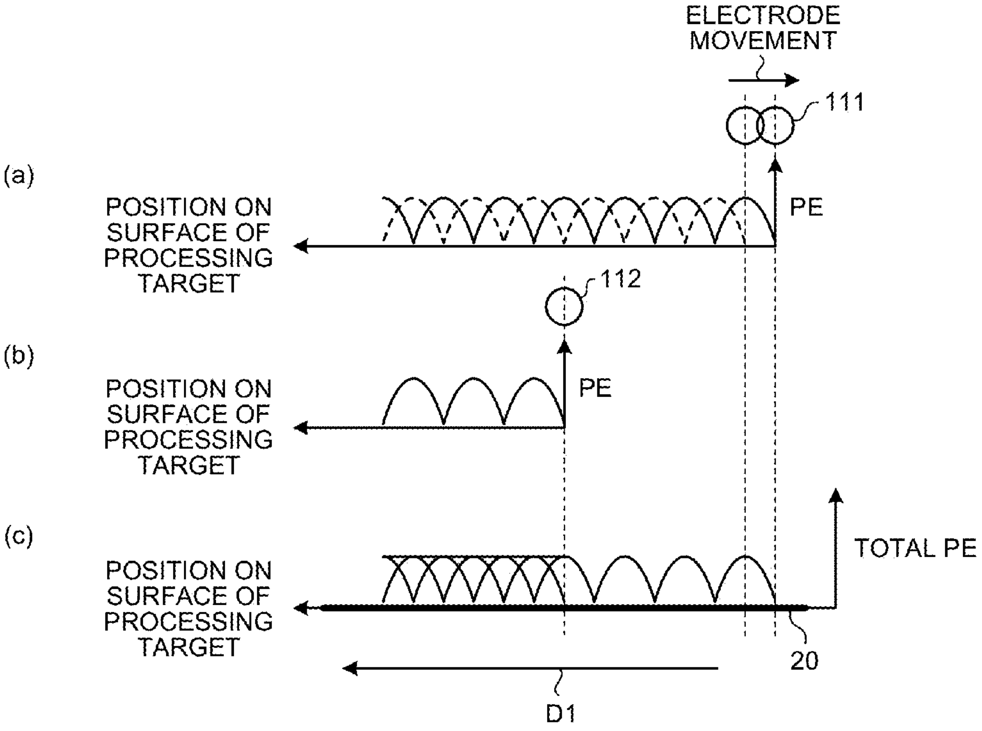
FIG. 18 is a diagram for explaining a typical example of a case where processing unevenness is reduced by changing the inter-electrode distance between two discharge electrodes.

FIG. 18 is a diagram for explaining a typical example of a case where processing unevenness is reduced by changing the inter-electrode distance between the two discharge electrodes 111 and 112. In FIG. 18, positions are aligned between (a) to (c) based on a position on the surface of the processing target 20. In FIG. 18, the abscissa indicates the position on the surface of the processing target. In FIGS. 18(*a*) and 18(*b*), the ordinate indicates the amount of plasma energy (PE) supplied to the surface of the processing target. In FIG. 18(*c*), the ordinate indicates the total amount of plasma energy (total PE) supplied to the surface of the processing target.

As illustrated in FIG. 18, the position of the discharge electrode 111 is moved by a half period along the conveyance path D1 in a state where the phase of the applied voltage waveform A and that of the applied voltage waveform B coincide with each other, for example. This can shift the phase of the applied voltage waveform A with respect to the phase of the applied voltage waveform B by a half period. Thus, a waveform obtained by combining the applied voltage waveform A and the applied voltage waveform B is a waveform of constant output as illustrated in FIG. 18(*c*). This makes it possible to supply a uniform amount of plasma energy to the surface of the processing target 20. The discharge electrode to be moved is not limited to the discharge electrode 111, and the position of at least one of the discharge electrodes 111 and 112 is moved along the conveyance path D1.

Table 3 indicates correspondence between processing conditions of plasma processing and the phase adjustment amount in a case where the inter-electrode distance between electrodes is changed. In Table 3, the AC input frequency and the timing of the input waveform and the conveyance speed of the processing target 20 are constant.

TABLE 3

| | | Condition (11) | Condition (12) | Condition (13) | Condition (14) | Condition (15) | Condition (16) |
|---|---|---|---|---|---|---|---|
| Conveyance speed [mm/s] | V | 200 | 200 | 200 | 200 | 200 | 200 |
| Processing unevenness pitch [mm] | V/(f × 2) | 2.00 | 2.00 | 2.00 | 2.00 | 2.00 | 2.00 |
| Inter-electrode distance [mm] | B | 6.0 | 6.2 | 6.4 | 6.6 | 6.8 | 7.0 |
| Inter-electrode movement time [s] | B/V | 0.030 | 0.031 | 0.032 | 0.033 | 0.034 | 0.035 |
| Number of periods of processing unevenness between electrodes [period] | X = (B × f × 2) | 3.00 | 3.10 | 3.20 | 3.30 | 3.40 | 3.50 |
| Inter-waveform deviation period [period] | Xs (fractional portion of X) | 0.00 | 0.10 | 0.20 | 0.30 | 0.40 | 0.50 |
| Required phase adjustment amount [period] | | Large | Large | Small | Small | Small | None |
| | | ↓ | ↓ | ↓ | ↓ | ↓ | ↓ |
| Phase adjustment amount [period] | 1/N − Xs | 0.50 | 0.40 | 0.30 | 0.20 | 0.10 | 0.00 |

As indicated in Table 1 and the conditions (11) to (16) in Table 3, the AC input frequency is set to 50 Hz, the conveyance speed is set to 200 mm/s, and the phases of the applied voltage waveforms A and B input to the discharge electrodes 111 and 112, respectively, coincide with each other. To reduce processing unevenness the most in this case, it is necessary to set the inter-electrode distance to 7.0 mm as indicated in the condition (16). In the second example, the control unit 160 drives any one or both of the driving units 301 and 302, thereby setting the inter-electrode distance between the two discharge electrodes 111 and 112 to 7.0 mm. This can reduce processing unevenness occurring in the plasma processing, thereby improving the quality of an image formed by the inkjet recording apparatus 170.

Table 4 indicates an example of the optimum inter-electrode distance depending on the conveyance speed of the processing target. As indicated in the conditions (21) to (26) in Table 4, the optimum inter-electrode distance does not increase with an increase in the conveyance speed of the processing target 20. In other words, the optimum inter-electrode distance is preferably determined in consideration not only of reduction in processing unevenness but also of influences between the discharge electrodes 110 and avoidance of increasing the plasma processing apparatus 100 in size.

TABLE 4

| | | Condition (21) | Condition (22) | Condition (23) | Condition (24) | Condition (25) | Condition (26) |
|---|---|---|---|---|---|---|---|
| Conveyance speed [mm/s] | V | 100 | 200 | 300 | 400 | 500 | 600 |
| Processing unevenness pitch [mm] | V/(f × 2) | 1.00 | 2.00 | 3.00 | 4.00 | 5.00 | 6.00 |
| Inter-electrode distance [mm] | B | 6.5 | 7.0 | 7.5 | 6.0 | 7.5 | 9.0 |
| Inter-electrode movement time [s] | B/V | 0.065 | 0.035 | 0.025 | 0.015 | 0.015 | 0.015 |
| Number of periods of processing unevenness between electrodes [period] | X = (B × f × 2) | 6.50 | 3.50 | 2.50 | 1.50 | 1.50 | 1.50 |
| Inter-waveform deviation period [period] | Xs (fractional portion of X) | 0.50 | 0.50 | 0.50 | 0.50 | 0.50 | 0.50 |
| Required phase adjustment amount [period] | | None | None | None | None | None | None |
| | | ↓ | ↓ | ↓ | ↓ | ↓ | ↓ |
| Phase adjustment amount [period] | Y = 1/N − Xs | 0.00 | 0.00 | 0.00 | 0.00 | 0.00 | 0.00 |

Figure 19:
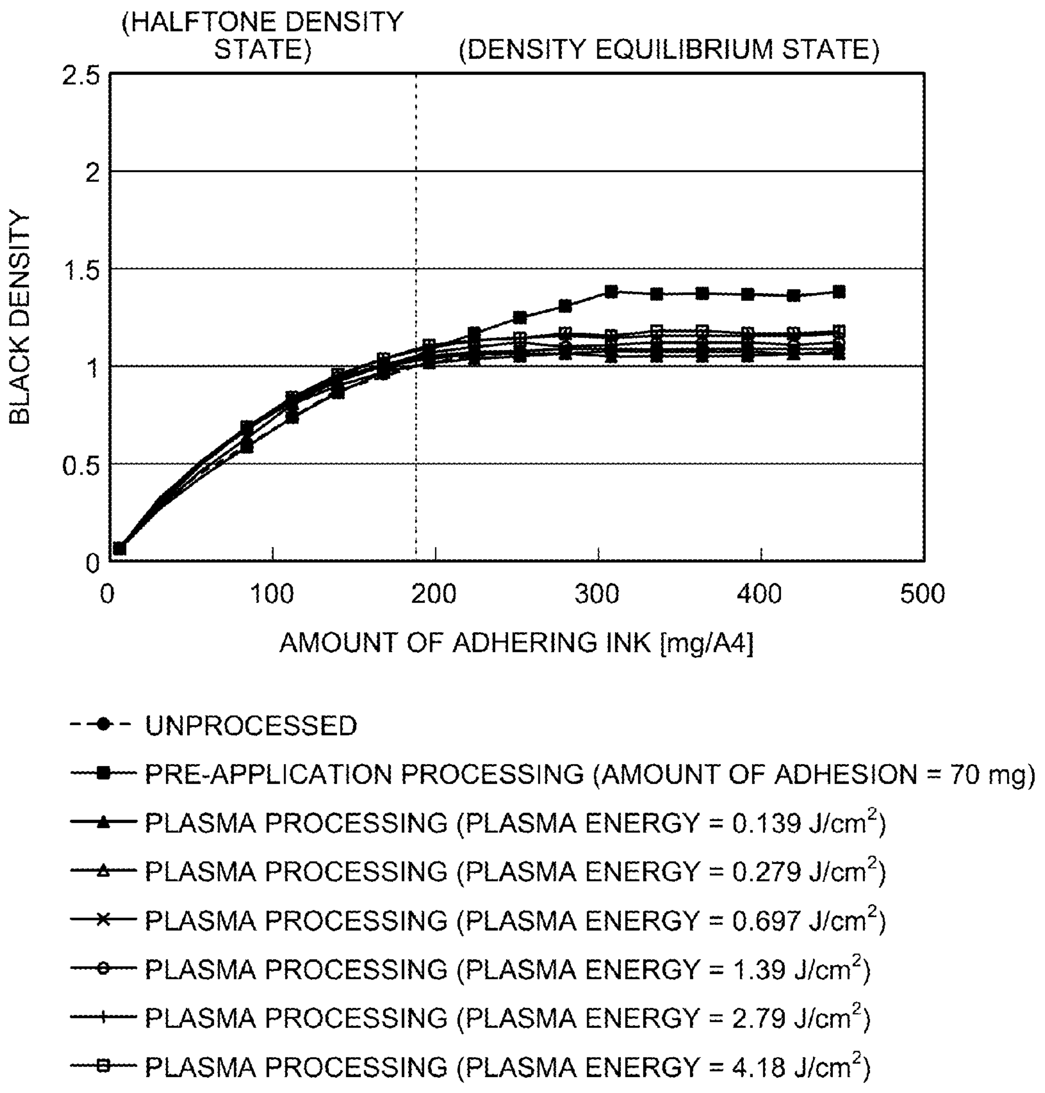
FIG. 19 is a graph of measurement results of the image (dot) density with respect to the amount of adhering ink of the processing target subjected to pre-application processing and the processing target subjected to plasma processing.

FIG. 19 illustrates measurement results of the image (dot) density with respect to the amount of adhering ink of the processing target subjected to pre-application processing and the processing target subjected to plasma processing. In FIG. 19, plain paper is used as the processing target 20, and a black ink is used as the ink. As illustrated in FIG. 19, in the case of using plain paper as the processing target 20, the dot density of the plain paper subjected to plasma processing was generally higher than that of plain paper subjected to no preprocessing (hereinafter, referred to as unprocessed plain paper). The dot density of the plain paper subjected to plasma processing, however, was lower in saturation concentration than that of the plain paper subjected to preprocessing.

The dot density before reaching a density equilibrium state (halftone density) increases more efficiently in plasma processing than in pre-application processing. This indicates that, to form a halftone dot, the plain paper subjected to plasma processing requires a smaller amount of adhering ink to achieve the same dot density than the plain paper subjected to pre-application processing. Specifically, the amount of adhering ink was successfully reduced by 1% to 18% in the plain paper subjected to plasma processing compared with the unprocessed plain paper and by 15% to 29% compared with the plain paper subjected to pre-application processing.

The saturation concentration of the plain paper subjected to plasma processing is lower than that of the plain paper subjected to pre-application processing. The reason of this is considered that the dot density increases due to set effects in the plain paper subjected to pre-application processing. In other words, it is considered that a landing dot spreads on the plain paper subjected to plasma processing, pigments are dispersed by the spread, thereby lowering the peak density even in the same amount of adhering ink. By contrast, a dot is less likely to spread on the plain paper subjected to pre-application processing, thereby increasing the saturation concentration.

According to the results above, plasma processing and pre-application processing exert different effects on a well permeable processing target and a less permeable processing target. Thus, combination of plasma processing and pre-application processing in the printing system can improve response capability to image formation of the processing target 20. The combination of plasma processing and pre-application processing can reduce the amount of plasma energy to approximately one-twentieth of that in the case of performing plasma processing alone and reduce the amount of application to approximately three-fifths of that in the case of performing pre-application processing alone. This means that a high-quality printed material can be provided with low power consumption and a small amount of application. Furthermore, high dot density can be achieved, thereby reducing the amount of adhering ink. This can further reduce printing cost.

According to the results illustrated in FIG. 19, it is found that plasma processing effectively acts on a less permeable processing target and pre-application processing effectively acts on a well permeable processing target. Thus, by appropriately adjusting conditions for performing plasma processing and pre-application processing depending on the property of a processing target, it is possible to perform optimum preprocessing on the processing target.

Figure 20:
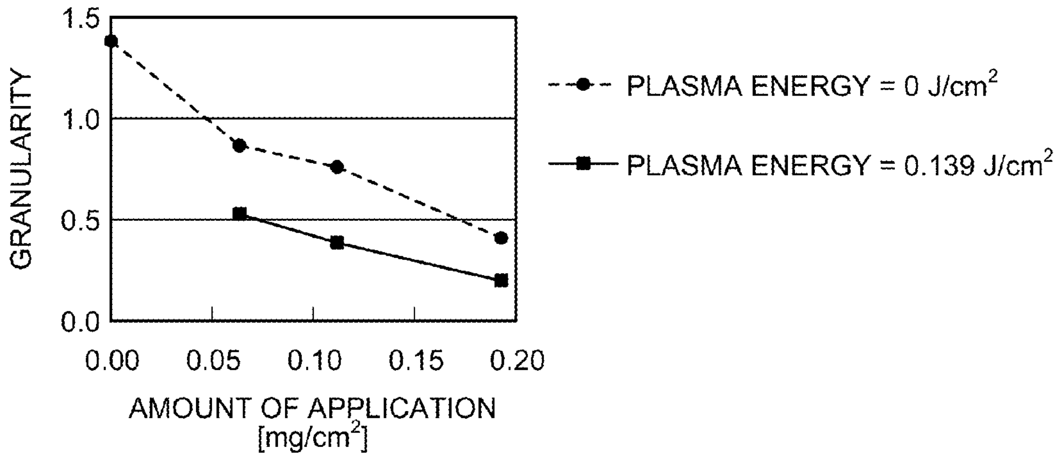
FIG. 20 is a graph of the granularity of a less permeable processing target in a case where plasma processing and pre-application processing are combined.

FIG. 20 is a graph of the granularity of a less permeable processing target in a case where plasma processing and pre-application processing are combined. In the graph in FIG. 20, a more excellent image has a lower granularity. In FIG. 20, the dashed line indicates results on the amount of applied processing liquid in pre-application processing in a case where the amount of plasma energy is set to 0 J/cm$^2$ (that is, no plasma processing is performed). The solid line indicates results on the amount of applied processing liquid in pre-application processing in a case where the amount of plasma energy is set to 0.14 J/cm$^2$ (that is, plasma processing and pre-application processing are combined). To achieve granularity of equal to or lower than 0.5, for example, pre-application processing alone requires an amount of application of approximately 0.2 mg/cm$^2$ as illustrated in FIG. 20. By contrast, a combination of plasma processing and pre-application processing requires an amount of application of approximately 0.1 mg/cm$^2$, which is substantially a half of that in the case of performing pre-application processing alone.

The optimization control derived from FIG. 20 is in terms of the processing target. In terms of optimization of an image, the optimization control is preferably performed based on a printed material obtained by actually performing printing. A reflection densitometer, for example, is incorporated into the printing apparatus (system) 1, and the energy in plasma processing and the amount of application in pre-application processing for the processing target are continuously changed. Subsequently, the inkjet recording apparatus 170 prints a printing pattern serving as a reference, and the reflection densitometer measures the printing density of the obtained printed material. Processing conditions that achieve the highest printing density are determined to be optimum conditions. The printing apparatus (system) 1 then performs inkjet recording while performing optimization control to maintain the optimum conditions. This enables measurement, change of the processing conditions, and the like in a short time, making it possible to increase throughput in printing. Furthermore, it is possible to accumulate the optimum conditions specified based on density information retrieved from the reflection densitometer as a database.

In a case where the component or the type of the ink or the type of the processing target is changed, the optimum conditions may possibly change. By accumulating and managing the optimum conditions in association with the component and the type of the ink and the type of the processing target, it is possible to perform the optimization control depending on various conditions.

Furthermore, it is easily conceivable to derive the optimum conditions by performing the sturdy as described above after determining the thickness and the property of the processing target to a certain extent before the plasma processing by measuring electric resistance of the processing target, for example.

In a case where the processing target is a cut sheet, a sensor may be provided to an ejecting unit of the plasma processing apparatus 100 and an ejecting unit of the pre-application processing apparatus to grasp the state of processing. The processing target may be reprocessed via another conveyance path as needed. In this case, the control unit 160 may perform feedback control or feedforward control on the processing conditions of the plasma processing apparatus 100 and the pre-application processing apparatus based on information transmitted from the sensor.

As described above, combination of plasma processing and pre-application processing can reduce the amount of energy required in the plasma processing and downsize the printing apparatus (system) 1. Furthermore, the combination can reduce the amount of application in the pre-application processing and the amount of drying time and drying energy for the processing liquid and the vehicle. It is also possible to reduce the amount of used ink. By performing inkjet recording after the combination of plasma processing and pre-application processing is performed, it is possible to make a dot into a shape close to a perfect circle and prevent mixture of pigments even if dots unite. This can provide an excellent image with less bleeding. Performing plasma processing alone also can provide an excellent image with less beading and bleeding as described above. Thus, the combination of plasma processing and pre-application processing is not necessarily performed depending on conditions.

An embodiment can provide a processing target reforming apparatus, a printing apparatus, a printing system, and a method that can manufacture a high-quality printed material while suppressing an increase in cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A processing target reforming apparatus comprising:

a conveying unit that conveys a processing target along a conveyance path;

a discharge unit including a plurality of discharge electrodes aligned along the conveyance path, a counter electrode arranged facing the discharge electrodes with the conveyance path interposed therebetween, and a power source that applies a voltage waveform to the discharge electrodes; and a control unit that controls the discharge unit such that a phase of the voltage waveform applied to a first discharge electrode of the discharge electrodes at a timing when a certain point of the processing target passes between the first discharge electrode and the counter electrode is shifted with respect to a phase of the voltage waveform applied by the power source to a second discharge electrode of the discharge electrodes at a timing when the certain point of the processing target passes between the second discharge electrode and the counter electrode;

wherein the control unit controls the discharge unit such that the phase of the voltage waveform applied to the first discharge electrode is shifted with respect to the phase of the voltage waveform applied to the second discharge electrode based on a value read from memory indicating a distance between the first discharge electrode and the second discharge electrode and on a conveyance speed of the processing target conveyed by the conveying unit.

2. The processing target reforming apparatus according to claim 1, wherein the power source applies the voltage waveform of a same period to the discharge electrodes, and the control unit controls the discharge unit such that the phase of the voltage waveform applied to the first discharge electrode is shifted with respect to the phase of the voltage waveform applied to the second discharge electrode by a period obtained by dividing one period of the voltage waveform by number of the discharge electrodes.

3. The processing target reforming apparatus according to claim 1, wherein the control unit controls at least one of the phase of the voltage waveform applied to the first discharge electrode and the phase of the voltage waveform applied to the second discharge electrode, thereby controlling the discharge unit such that the phase of the voltage waveform applied to the first discharge electrode is shifted with respect to the phase of the voltage waveform applied to the second discharge electrode.

4. The processing target reforming apparatus according to claim 1, wherein the discharge unit further includes a moving mechanism that adjusts a distance between the discharge electrodes, and the control unit adjusts the distance between the first discharge electrode and the second discharge electrode by driving the moving mechanism, thereby controlling the discharge unit such that the phase of the voltage waveform applied to the first discharge electrode is shifted with respect to the phase of the voltage waveform applied to the second discharge electrode.

5. A printing apparatus including at least a plasma processing unit that performs plasma processing on a processing target and a recording unit that performs inkjet recording on a surface of the processing target on which plasma processing is performed by the plasma processing unit, wherein the processing target reforming apparatus according to claim 1 is used as the plasma processing unit.

6. A printing system including at least a plasma processing apparatus that performs plasma processing on a processing target and a recording apparatus that performs inkjet recording on a surface of the processing target on which plasma processing is performed by the plasma processing apparatus, the printing system comprising:

a conveying unit that conveys the processing target along a conveyance path;

a discharge unit including a plurality of discharge electrodes aligned along the conveyance path, a counter electrode arranged facing the discharge electrodes with the conveyance path interposed therebetween, and a power source that applies a voltage waveform to the discharge electrodes; and a control unit that controls the discharge unit such that a phase of the voltage waveform applied to a first discharge electrode of the discharge electrodes at a timing when a certain point of the processing target passes between the first discharge electrode and the counter electrode is shifted with respect to a phase of the voltage waveform applied by the power source to a second discharge electrode of the discharge electrodes at a timing when the certain point of the processing target passes between the second discharge electrode and the counter electrode;

wherein the control unit controls the discharge unit such that the phase of the voltage waveform applied to the first discharge electrode is shifted with respect to the phase of the voltage waveform applied to the second discharge electrode based on a value read from memory indicating a distance between the first discharge electrode and the second discharge electrode and on a conveyance speed of the processing target conveyed by the conveying unit.

7. A method using a printing apparatus including at least a plasma processing unit that performs plasma processing on a processing target and a recording unit that performs inkjet recording on a surface of the processing target on which plasma processing is performed by the plasma processing unit, the plasma processing unit including a conveying unit that conveys the processing target along a conveyance path and a discharge unit including a plurality of discharge electrodes aligned along the conveyance path, a counter electrode arranged facing the discharge electrodes with the conveyance path interposed therebetween, and a power source that applies a voltage waveform to the discharge electrodes, the method comprising:

performing plasma processing on the processing target with the plasma processing unit;

controlling the discharge unit such that a phase of the voltage waveform applied to a first discharge electrode of the discharge electrodes at a timing when a certain point of the processing target passes between the first discharge electrode and the counter electrode is shifted with respect to a phase of the voltage waveform applied by the power source to a second discharge electrode of the discharge electrodes at a timing when the certain point of the processing target passes between the second discharge electrode and the counter electrode; and performing inkjet recording on the surface of the processing target with the recording unit;

wherein the discharge unit is controlled such that the phase of the voltage waveform applied to the first discharge electrode is shifted with respect to the phase of the voltage waveform applied to the second discharge electrode based on a value read from memory indicating a distance between the first discharge electrode and the second discharge electrode and on a conveyance speed of the processing target conveyed by the conveying unit.

* * * * *